(12) United States Patent
Bakulin et al.

(10) Patent No.: US 11,994,639 B2
(45) Date of Patent: May 28, 2024

(54) SEISMIC VELOCITY MODELING

(71) Applicants: Saudi Arabian Oil Company, Dhahran (SA); Trofimuk Institute of Petroleum Geology and Geophysics, Novosibirsk (RU)

(72) Inventors: Andrey Bakulin, Dhahran (SA); Dmitry Neklyudov, Novosibirsk (RU); Maxim Dmitriev, Dhahran (SA); Ilya Silvestrov, Dhahran (SA); Kirill Gadylshin, Novosibirsk (RU); Maxim Protasov, Berdsk (RU)

(73) Assignees: Saudi Arabian Oil Company, Dhahran (SA); Trofimuk Institute of Petroleum Geology and Geophysics, Novosibirsk (RU)

( * ) Notice: Subject to any disclaimer, the term of this patent is extended or adjusted under 35 U.S.C. 154(b) by 235 days.

(21) Appl. No.: 17/595,365

(22) PCT Filed: May 15, 2019

(86) PCT No.: PCT/RU2019/000336
§ 371 (c)(1),
(2) Date: Nov. 15, 2021

(87) PCT Pub. No.: WO2020/231289
PCT Pub. Date: Nov. 19, 2020

(65) Prior Publication Data
US 2022/0221606 A1 Jul. 14, 2022

(51) Int. Cl.
*G01V 1/30* (2006.01)
*G01V 1/36* (2006.01)

(52) U.S. Cl.
CPC .............. *G01V 1/305* (2013.01); *G01V 1/362* (2013.01); *G01V 2210/514* (2013.01); *G01V 2210/6222* (2013.01)

(58) Field of Classification Search
CPC .. G01V 1/305; G01V 1/362; G01V 2210/514; G01V 2210/6222
See application file for complete search history.

(56) References Cited

U.S. PATENT DOCUMENTS 3,597,727 A 8/1971 Judson et al.
3,806,863 A 4/1974 Brown et al.
(Continued)

FOREIGN PATENT DOCUMENTS

CN 102109612 6/2011
CN 102478671 5/2012
(Continued)

OTHER PUBLICATIONS

Bakulin et al., "Application of supergrouping to enhance 3D prestack seismic data for a desert environment," the Leading Edge, Mar. 2018, 8 pages.
(Continued)

*Primary Examiner* — Elias Desta
(74) *Attorney, Agent, or Firm* — Fish & Richardson P.C.

(57) ABSTRACT

Methods, systems, and apparatus, including computer programs encoded on a computer storage medium, for determining a velocity model for a geological region. In one aspect, a method comprises: obtaining a current velocity model for the geological region; obtaining pre-stack and post-stack seismic data characterizing the geological region; and for each of a plurality of iterations: identifying a plurality of reflection events from the post-stack seismic data and the current velocity model; determining a respective observed travel time for each of the plurality of reflection events, comprising, for each reflection event, determining the respective observed travel time for the reflection event based at least in part on kinematic features derived from a respective seismic trace included in the pre-stack seismic data; and updating the current velocity model based (Continued)

at least in part on the observed travel times of the plurality of reflection events.

20 Claims, 5 Drawing Sheets

(56) References Cited

U.S. PATENT DOCUMENTS

| | | | |
|---|---|---|---|
| 6,876,599 | B1 | 4/2005 | Combee |
| 6,904,368 | B2* | 6/2005 | Reshef ............... G01V 1/362 |
| | | | 702/17 |
| 7,379,386 | B2 | 5/2008 | Muyzert et al. |
| 7,453,764 | B2 | 11/2008 | Cavalca et al. |
| 9,470,811 | B2* | 10/2016 | Sun .................. G01V 1/282 |
| 2008/0049551 | A1 | 2/2008 | Muyzert et al. |
| 2017/0269246 | A1 | 9/2017 | Anderson et al. |
| 2020/0400847 | A1 | 12/2020 | Bakulin et al. |

FOREIGN PATENT DOCUMENTS

| | | |
|---|---|---|
| CN | 102854530 | 1/2013 |
| CN | 104268412 | 1/2015 |
| CN | 106443787 | 2/2017 |
| CN | 107340541 | 11/2017 |
| EP | 2762926 | 8/2014 |
| WO | WO 2019156586 | 8/2019 |
| WO | WO 2021020984 | 2/2021 |

OTHER PUBLICATIONS

Bakulin et al., "Application of supergrouping to land seismic data in desert environment," SEG International Exposition and 86th Annual Meeting, 2016, 5 pages.

Bakulin et al., "Nonlinear beaforming for enhancing prestack seismic data with a challenging near surface or overburden," Data Processing & Machine Learning, Dec. 2018, 6 pages.

Bakulin et al., "Nonlinear beamforming for enhancing pre-stack data with challenging near surface or overburden," SEG Technical Program Expanded Abstracts, Aug. 2017, 5 pages.

Baykulov et al., "Prestack seismic data enhancement with partial common-reflection-surface (CRS) stack," Geophysics, May-Jun. 2009, 74(3): 49-58, 10 pages.

Berkovitch et al., "How non-hyperbolic MultiFocusing improves depth imaging," First Break, Sep. 2011, 29:95-103, 9 pages.

Billete et al., "Practical aspects and applications of 2D stereotomography," Geophysics, May 2003, 68(3):1008-1021, 14 pages.

Bishop et al., "Tomographic determination of velocity and depth in laterally varying media," Geophysics, Jun. 1985, 50(6):903-923, 22 pages.

Buzlukov et al., "Imaging improvement by prestack signal enhancement," Geophysical Prospecting, 2013, 61:1150-1158, 9 pages.

Buzlukov et al., "Prestack data enhancement using local traveltime approximation," 72nd EAGE Conference & Exhibition incorporating EUROPEC, Barcelona, Spain, Jun. 14-17, 2010, 5 pages.

Duveneck, "Tomographic velocity model estimation with data-derived first and second travel time derivatives," presented at the 8th International Congress of the Brazilian Geophysical Society, Brazil, Sep. 14-18, 2003, 4 pages.

Duveneck, "Tomographic determination of seismic velocity models with kinematic wavefield attributes," Zur Erlangung des akademischen Grades eines, Doktors De Naturwissenschaften von der Fakultat fur Physik der Universitat Karlsruhe (TH) genehmigte, Dissertation von Dipl.-Geophys., Jun. 2004, 201 pages.

Duveneck, "Velocity model estimation with data-derived wavefront attributes," Geophysics, Jan. 2004, 69(1):265-274, 10 pages.

Fagin, "Model based depth imaging," Society of Exploration Geophysics, Course Notes Series No. 10, Tulsa, USA, 1999, 184 pages.

Gjoystdal et al., "Inversion of reflection times in three dimensions," Geophysics, Jul. 1981, 46(7):972-983, 12 pages.

Hoecht et al., "Operator-oriented CRS interpolation," Geophysical Prospecting, 2009, 57:957-979, 23 pages.

Hubral et al., "Interval Velocities from Seismic Reflection Time Measurements," Society of Exploration Geophysicists, 1980, 214 pages.

Jones, "Estimating subsurface parameter fields for seismic migration: Velocity model building," Seismic velocity/statics, Oct. 2015, 24 pages.

Khaidukov et al., "Enhancement of seismic data gathered by floating ice acquisition: application of local kinematic attributes," SEG International Exposition and 86th Annual Meeting, 2016, 5 pages.

Klüver, "Velocity model building using migration to residual time," SEG Technical Program Expanded Abstracts, SEG/New Orleans 2006 Annual Meeting, 5 pages.

Lambaré et al., "Multi-layer non-linear slope tomography," 75th Annual International Conference and Exhibition, EAGE, Extended Abstracts, London, Jun. 10-13, 2013, 5 pages.

Lambaré, "Stereotomography," Geophysics, Sep. 2008, 73(5):VE25-VE34, 10 pages.

Lavaud et al., "Automatic robust velocity estimation by poststack stereotomography," SEG Technical Program Expanded Abstracts 2004, SEG International Exposition and 74th Annual Meeting, Oct. 10-15, 2004, 4 pages.

Neckludov et al., "Residual stereotomographic inversion," Geophysics, Jul. 2006, 71(4):E35-E39, 6 pages.

Neklyudov et al., "Intra-array statics and phase corrections obtained by beaforming in the short-time fourier transform domain: application to supergrouping," SEG International Exposition, 2017, 6 pages.

Tanushev et al., "Fast, high-resolution beam tomography and velocity-model building," The Leading Edge, Feb. 2017, 36(2):140-145, 6 pages.

Van Der Made et al., "Estimation of complex velocity models from stacking information," SEG Technical program Expanded Abstracts, 1987, 3 pages.

Woodward et al., "A decade of tomography," Geophysics, Sep.-Oct. 2008, 73(5), 7 pages.

Zhang et al., "Common-reflection-surface (CRS) stack for common offset," Geophysical Prospecting, 2001, 49:709-18, 10 pages.

PCT International Search Report and Written Opinion in International Appln. No. PCT/RU2019/000336, dated Feb. 26, 2020, 14 pages.

PCT International Search Report and Written Opinion in International Appln. No. PCT/RU2018/000079, dated Dec. 6, 2018, 12 pages.

U.S. Appl. No. 17/630,654, filed Jan. 27, 2022, Bakulin et al.
U.S. Appl. No. 17/630,663, filed Jan. 27, 2022, Bakulin et al.
U.S. Appl. No. 17/630,665, filed Jan. 27, 2022, Bakulin et al.

Alsteris et al., "Short-time phase spectrum in speech processing: A review and some experimental results," Digital Signal Processing, 2007, 17:578-616, 39 pages.

Curia et al., "The impact of multifocusing in the processing of land 3D seismic data in a fold and thrust belt setting: Ranquil Norte Block, Neuquén Basin, Argentina," The Leading Edge, 2013, 36(9):770-774, 5 pages.

Digital Signal Processing, Blackledget, Horwood Publishing, 2006, 2nd ed., 840 pages.

Erdogan et al., "Phase-sensitive and recognition-boosted speech separation using deep recurrent neural networks," Proc. Int. Conf. Acoust., Speech, Signal Process., 2015, 708-712, 5 pages.

Li et al., "A low rank approximation method for ice-break noise attenuation of simultaneous vibroseis data," SEG Technical Program Expanded Abstracts, Aug. 2017, 5 pages.

Liang et al., The optimal ratio time-frequency mask for speech separation in terms of the signal-to-noise ratio, The Journal of the Acoustical Society of America, 2013, 134(5):EL452, 8 pages.

Lichman et al., "Automated Phase-based Moveout Correction," 69th SEG Annual International Meeting, Expanded Abstracts, 2000, 5 pages.

(56) References Cited

OTHER PUBLICATIONS

Lichman et al., "Phase Inversion Deconvolution for Surface Consistent Processing and Multiple Attenuation," SEG Annual International Meeting, Expanded Abstracts, 1999, 4 pages.
Martin et al., "Noise Power Spectral Density Estimation Based on Optimal Smoothing and Minimum Statistics," IEEE Transactions on Speech and Audio Processing, Jul. 2001, 9(5):504-512, 9 pages 512.
Mueller et al., "Improving Prestack Migration with CRS Techniques—A Case Study," 72nd EAGE Conference and Exhibition, Expanded Abstract, Jun. 2010, 5 pages.
Robinson et al., "Geophysical signal analysis," Society of Exploration Geophysicists, 2000, 481 pages.
Ulrych et al., "The essence of phase in seismic data processing and inversion," 77th SEG Annual Meeting, Expanded Abstracts, 2007, 1765-1769, 5 pages.
Wang et al., "Time-frequency masking for speech separation and its potential for hearing aid design," Trends in Amplificat., 2008, 12:332-353, 22 pages.
Wikipedia.com [online], "Median filter," Last edited Sep. 10, 2021 retrieved Apr. 8, 2022, retrieved from URL <https://en.wikipedia.org/wiki/Median_filter>, 4 pages.
Williamson et al., "Time-Frequency Masking in the Complex Domain for Speech Dereverberation and Denoising," IEEE/ACM Transactions on Audio, Speech and Language Processing, May 2016, 13(9):1-10, 10 pages.
Yilmaz et al., "Blind separation of speech mixtures via time-frequency masking," IEEE Trans. Signal Process, Jul. 2004, 52(7):1830-1846, 19 pages.
PCT International Search Report and Written Opinion in International Appln. No. PCT/RU2019/000532, dated Apr. 3, 2020, 17 pages.
PCT International Search Report and Written Opinion in International Appln. No. PCT/RU2019/000534, dated Apr. 3, 2020, 17 pages.
PCT International Search Report and Written Opinion in International Appln. No. PCT/RU2019/000533, dated Apr. 8, 2020, 13 pages.
RU Office Action in Russian Appln. No. 2022103676, dated Jan. 18, 2023, 10 pages, with English Translation.
RU Office Action in Russian Appln. No. 2022104308, dated Jan. 12, 2023, 11 pages, with English Translation.
RU Office Action in Russian Appln. No. 2022104454, dated Jan. 16, 2023, 10 pages, with English Translation.
Bakulin et al., "3D data-domain reflection tomography for initial velocity model building using challenging 3D seismic data," Journal of Seismic Exploration, 2021, 30:419-446, 28 pages.
Stork, "Reflection tomography in the postmigrated domain," Geophysics, May 1992, 57(5):680-692, 13 pages.
RU Office Action in Russian Appln. No. 2021135462, dated Sep. 20, 2022, 12 pages, with English Translation.
Billette et al., "Practical aspects and applications of 2D stereotomography," Geophysics, May-Jun. 2003, 68(3):1008-1021, 14 pages.
Neckludov et al., "Residual stereotomographic inversion," Geophysics, Jul.-Aug. 2006, 71(4): E35-E39, 5 pages.
SAIP Examination Report in SAIP Appln. No. 521430857, dated Dec. 22, 2023, 12 pages with English translation.

\* cited by examiner

SEISMIC VELOCITY MODELING

CROSS-REFERENCE TO RELATED APPLICATION(S)

This application is a U.S. National Phase Application under 35 U.S.C. § 371 and claims the benefit of priority to International Application Serial No. PCT/RU2019/000336, filed May 15, 2019, the contents of which are hereby incorporated by reference.

BACKGROUND

This specification relates to reflection seismic tomography.

Reflection seismic tomography can be used to determine a velocity model for a geological region. A velocity model for a geological region characterizes respective velocities of seismic waves travelling through different spatial positions in the geological region. For example, a velocity model can be represented as a three-dimensional (3D) matrix of numerical values, where each component of the matrix corresponds to a respective spatial position in the geological region. In this example, the value of each component of the matrix indicates the velocity of seismic waves traveling through the spatial position in the geological region that corresponds to the component of the matrix.

Generally, seismic waves may travel at different velocities through different spatial positions in a geological region, for example, due to differences in the density of the rock and sediment at different spatial positions in the geological region.

SUMMARY

This specification describes a system implemented as computer programs on one or more computers in one or more locations that generates a velocity model for a geological region using kinematic features derived from pre-stack and post-stack seismic data.

According to a first aspect there is provided a method implemented by one or more data processing apparatus for determining a velocity model for a geological region. The method includes obtaining a current velocity model for the geological region that characterizes, for each of multiple spatial locations in the geological region, a respective velocity of seismic waves traveling through the spatial location. Pre-stack seismic data including multiple seismic traces characterizing the geological region, and post-stack seismic data generated based on the pre-stack seismic data using a seismic stacking technique, are obtained.

For each of multiple iterations, multiple reflection events are identified from the post-stack seismic data and the current velocity model. Each reflection event corresponds to: (i) a position of a seismic source that transmits a seismic wave, (ii) a local reflection surface in the geological region, and (iii) a position of a seismic receiver that receives a reflection of the seismic wave from the local reflection surface. A respective observed travel time is determined for each of the multiple reflection events, including, for each reflection event: identifying a respective seismic trace included in the pre-stack seismic data based on the reflection event, and determining the respective observed travel time for the reflection event based at least in part on kinematic features derived from the respective seismic trace included in the pre-stack seismic data. The current velocity model is updated based at least in part on the observed travel times of the multiple reflection events.

In some implementations, the method further includes generating enhanced pre-stack seismic data by applying a non-linear beamforming data enhancement technique to the pre-stack seismic data, including deriving kinematic features of seismic traces included in the pre-stack seismic data. The post-stack seismic data is generated by processing the enhanced pre-stack seismic data using the seismic stacking technique.

In some implementations, deriving kinematic features of the seismic traces included in the pre-stack seismic data includes generating first partial derivatives, second partial derivatives, and semblance features at reference points in the pre-stack seismic data.

In some implementations, the reference points in the pre-stack seismic data are on a coarse grid.

In some implementations, identifying a reflection event includes identifying a point in the post-stack seismic data that corresponds to a respective local reflection surface based on a kinematic feature derived at the point in the post-stack seismic data. A spatial location of the respective local reflection surface is determined by performing ray tracing using the current velocity model, including tracing a ray from an acquisition surface into the current velocity model until half of a two-way travel time along a normal ray of the respective local reflection surface expires. A position of a respective seismic source and a position of a respective seismic receiver are determined based on the spatial location of the respective local reflection surface.

In some implementations, determining the position of the respective seismic source includes tracing a first ray from the spatial location of the respective local reflection surface to the acquisition surface using the current velocity model. The position of the respective seismic source is determined based on a position at which the first ray penetrates the acquisition surface. Determining the position of the respective seismic receiver includes tracing a second ray from the spatial location of the respective local reflection surface to the acquisition surface using the current velocity model, and determining the position of the respective seismic receiver based on a position at which the second ray penetrates the acquisition surface.

In some implementations, determining the respective observed travel time for the reflection event based at least in part on kinematic features derived from the respective seismic trace included in the pre-stack seismic data includes determining a normal-moveout travel time from a normal-moveout velocity model. A first correction term is determined based on the kinematic features derived from the respective seismic trace included in the pre-stack seismic data, including: determining, based on the normal-moveout travel time, a first time at which a semblance kinematic feature derived from the respective seismic trace included in the pre-stack seismic data is locally maximized, and determining the first correction term based on the first time. The respective observed travel time for the reflection event is determined based on the normal-moveout travel time and the first correction term.

In some implementations, kinematic features are computed for only a proper subset of the seismic traces of the pre-stack seismic data. Identifying a respective seismic trace included in the pre-stack seismic data based on the reflection event includes determining that the respective seismic trace is a closest seismic trace to a given seismic trace corresponding to the seismic source and the seismic receiver of the reflection event from among the proper subset of the seismic traces of the pre-stack seismic data for which kinematic features are computed.

In some implementations, the method further includes determining a second correction term based on the kinematic features derived from the respective seismic trace included in the pre-stack seismic data. The second correction term is determined based on: (i) first and second partial derivative kinematic features derived from the respective seismic trace included in the pre-stack seismic data, and (ii) a distance between the respective seismic trace and the given seismic trace corresponding to the seismic source and seismic receiver of the reflection event. The respective observed travel time is determined based on the second correction term in addition to the normal-moveout travel time and the first correction term.

In some implementations, identifying the reflection events from the post-stack seismic data and the current velocity model includes determining a respective calculated travel time for each of the reflection events. Updating the current velocity model includes: for each of the reflection events, determining a difference between the calculated travel time for the reflection event and the observed travel time for the reflection event, and determining an update to the current velocity model based on the differences between the calculated travel times and the observed travel times using a tomographic inversion technique.

In some implementations, the method further includes, after a final update iteration, providing the current velocity model for use in characterizing the geological region.

According to a second aspect there is provided a system including one or more computers; and one or more storage devices communicatively coupled to the one or more computers. The one or more storage devices store instructions that, when executed by the one or more computers, cause the one or more computers to perform the operations of the first aspect.

According to a third aspect there is provided one or more non-transitory computer storage media storing instructions that when executed by one or more computers cause the one or more computers to perform the operations of the first aspect.

Particular embodiments of the subject matter described in this specification can be implemented so as to realize one or more of the following advantages.

The velocity modeling system described in this specification can determine an estimated velocity model for a geological region using kinematic features derived from both pre-stack and post-stack seismic data characterizing the geological region. In particular, the velocity modeling system uses kinematic features derived from the post-stack seismic data to determine stable estimates of local reflection surfaces, and uses kinematic features derived from the pre-stack seismic data to determine "observed" travel times of reflected seismic waves with detailed resolution and great accuracy. In contrast, conventional systems that rely mostly (or entirely) on kinematic features derived from pre-stack seismic data may be unstable, that is, may generate velocity models that are sensitive to noise in the pre-stack seismic data. Moreover, conventional systems that rely mostly (or entirely) on kinematic features derived from post-stack seismic data may generate overly "smooth" velocity models, that is, velocity models that do not accurately represent the details of the actual seismic velocity model. By using kinematic features derived from both the pre-stack and post-stack seismic data, the velocity modeling system described in this specification can generate more accurate velocity models than some conventional systems.

The velocity models generated by the velocity modeling system described in this specification can be used directly for depth imaging or can serve as initial estimates for downstream velocity modeling systems (for example, migration velocity analysis (MVA) or full waveform inversion (FWI) systems). The accurate initial velocity model estimates generated by the velocity modeling system described in this specification can reduce computational resource consumption of downstream velocity modeling systems, for example, by reducing the number of iterations performed by MVA systems or by helping to avoid the cycle skipping problem in FWI systems.

The details of one or more embodiments of the subject matter of this specification are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
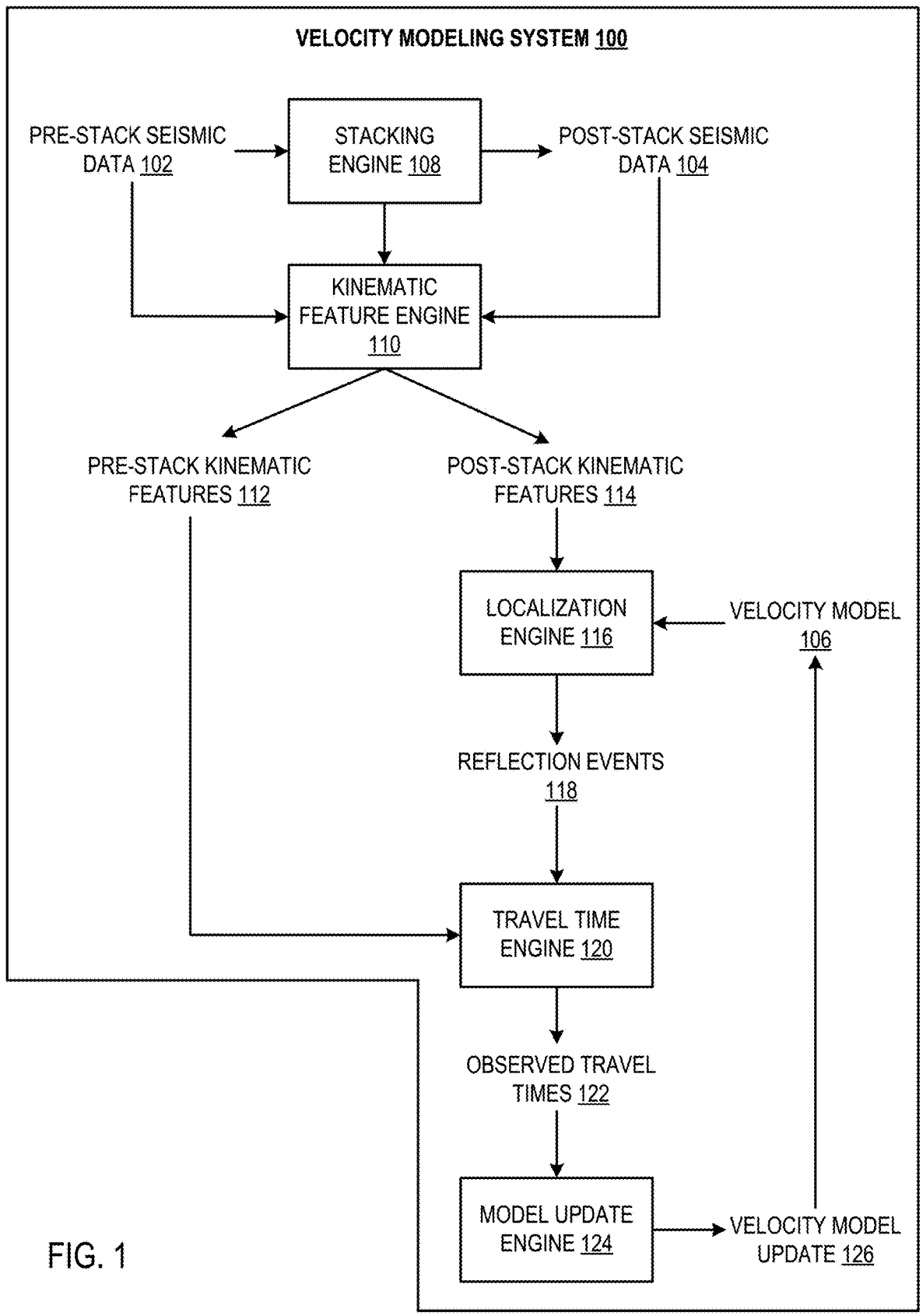
FIG. 1 is a block diagram of an example velocity modeling system.

FIG. 1 shows an example velocity modeling system 100. The velocity modeling system 100 is an example of a system implemented as computer programs on one or more computers in one or more locations in which the systems, components, and techniques described in this specification are implemented.

The velocity modeling system 100 is configured to process pre-stack seismic data 102 and post-stack seismic data 104 characterizing a geological region to generate a velocity model 106 for the geological region. The velocity model 106 for the geological region characterizes respective velocities of seismic waves travelling through different spatial positions in the geological region. For example, the velocity model 106 can be represented as a 3D matrix of numerical values, where each component of the matrix corresponds to a respective spatial position in the geological region. In this example, the value of each component of the matrix indicates the velocity of seismic waves traveling through the spatial position in the geological region that corresponds to the component of the matrix. Generally, seismic waves may travel at different velocities through different spatial positions in the geological region, for example, due to differences in the density of the rock and sediment at different spatial positions in the geological region.

The velocity model 106 generated by the system 100 can model any appropriate geological region. For example, the velocity model 106 can model a geological region corresponding to a square or rectangular region of the surface of the Earth that extends down a fixed distance (for example, several miles) into the interior of the Earth.

The velocity model 106 generated by the system 100 can be used for any of a variety of purposes. For example, the velocity model 106 can be used directly for depth imaging to model the structure of the geological region to facilitate, for example, oil and gas exploration and extraction. In some cases, the velocity model 106 generated by the system 100 can be provided as an input to another modeling system that further refines the velocity model 106. For example, the velocity model 106 generated by the system 100 can be used to initialize an FWI velocity modeling system or an MVA velocity modeling system.

The system 100 is configured to generate the velocity model 106 by iteratively updating an initial velocity model over multiple update iterations. The initial velocity model may be a predetermined (that is, fixed) velocity model, for example, a velocity model that associates each spatial position in the geological region with the same predetermined velocity. At each update iteration, the system 100 determines the "calculated" and "observed" travel times for multiple reflection events (that is, reflections of seismic waves from local reflectors in the geological region). The calculated travel time for a reflection event refers to the travel time of a seismic wave corresponding to the reflection event that is determined using the current velocity model 106. The observed travel time for a reflection event refers to the actual travel time of a seismic wave corresponding to the reflection event. The differences between the calculated and observed travel times of the reflection events indicates the accuracy of the current velocity model 106 (that is, where smaller differences between the calculated and observed travel times indicates a greater level of accuracy). At each update iteration, the system 100 provides the calculated and observed travel times of the reflection events as an input to a (3D) reflection seismic tomography algorithm to determine an updated velocity model 106 for the next update iteration. The system 100 eventually outputs the velocity model 106 obtained after the last update iteration.

Prior to iteratively updating the velocity model 106, the system 100 obtains pre-stack seismic data 102 that characterizes the geological region. The pre-stack seismic data 102 may include a large number of seismic "traces", where each trace characterizes the magnitude of the motion of the Earth at a respective receiver position due to a seismic wave generated at a respective source position. The pre-stack data 102 can be generated (for example, during a geological survey) by deploying an array of seismic sources (for example, air guns or seismic vibrators) and seismic receivers (for example, geophones) on the surface of the geological region. A seismic source can generate a seismic wave that is transmitted into the interior of the geological region and reflected from a local reflection surface. The reflected seismic wave can be recorded each of multiple seismic receivers, thereby generating multiple seismic traces. A seismic trace generated by a given seismic receiver can be represented as a vector, where each component of the vector represents the magnitude of the motion of the Earth at the location of the given seismic receiver at a respective time point.

The system 100 processes the pre-stack seismic data 102 using a stacking engine 108 to generate post-stack seismic data 104. The stacking engine 108 can generate the post-stack seismic data 104 using any appropriate stacking procedure. For example, the stacking engine 108 can generate post-stack seismic data 104 that includes a large number of seismic traces, where each trace in the post-stack seismic data is obtained by combining (for example, averaging) multiple traces from the pre-stack seismic data 102. The post-stack seismic data 104 may include "smoother" traces with a greater signal-to-noise (SNR) ratio than the pre-stack seismic data 102. In addition to generating the post-stack seismic data 104, the stacking engine 108 additionally generates a normal-moveout (NMO) velocity model that characterizes the shape of seismic reflected events in pre-stack data.

The system 100 processes both the pre-stack seismic data 102 and the post-stack seismic data 104 using a kinematic feature engine 110 to derive respective kinematic features from both the pre-stack seismic data 102 and the post-stack seismic data 104. More specifically, the system 100 generates pre-stack kinematic features 112 from the pre-stack seismic data 102, and the system 100 generates post-stack kinematic features 114 from the post-stack seismic data 104. As will be described in more detail later, in some cases, the system 100 generates the pre-stack kinematic features 112 as part of a data enhancement procedure based on non-linear beamforming (NLBF) that is applied to the pre-stack seismic data 102. In these cases, the system 100 may generate the post-stack seismic data 104 from the pre-stack seismic data 102 that has been enhanced using the NLBF data enhancement procedure.

The pre-stack kinematic features 112 and the post-stack kinematic features 114 may include one or more of: first partial derivative features, second partial derivative features, curvature features, and semblance features. In some cases, the system 100 generates pre-stack kinematic features 112 that characterize a proper subset (that is, a fraction) of the total number of seismic traces included in the pre-stack seismic data 102. For example, the system 100 may generate pre-stack kinematic features 112 only for seismic traces corresponding to a coarse grid over the pre-stack seismic data space. Since the number of seismic traces included in the pre-stack seismic data 102 may be large, the system 100 can reduce computational resource consumption (for example, of memory and computing power) by generating pre-stack kinematic features 112 for only a proper subset of the pre-stack seismic data 102.

After generating the pre-stack kinematic features 112 and the post-stack kinematic features 114, the system iteratively updates the current velocity model 106 over multiple update iterations. At each update iteration, the system 100 processes the post-stack kinematic features 114 and the current velocity model 106 using a localization engine 116 to determine multiple reflection events 118. Each reflection event 118 is associated with: (i) the position of a seismic source that transmits a seismic wave, (ii) a local reflection surface in the geological region that reflects the seismic wave, and (iii) the position of a seismic receiver that receives the reflection of the seismic wave from the local reflection surface. The system 100 uses the current velocity model 106 to determine the calculated travel time for each reflection event 118. Determining reflection events 118, and the calculated travel times for the reflection events 118, from the post-stack kinematic features 114 and the current velocity model 106 is described in more detail with reference to FIG. 6.

For each of the reflection events 118, the system 100 processes the pre-stack kinematic features 112 and the NMO velocity model (generated by the stacking engine 108) using a travel time engine 120 to generate an observed travel time 122 for the reflection event 118. More specifically, the system 100 can determine the observed travel time 122 for a reflection event 118 based on: (i) an NMO travel time derived from the NMO velocity model and (ii) a first correction term based on the semblance kinematic features included in the pre-stack kinematic features 112. If the pre-stack kinematic features 112 are computed on a coarse grid in the pre-stack data space, then the system 100 may additionally determine the observed travel time 122 based on a second correction term derived from the first and second partial derivative pre-stack kinematic features 112.

The system 100 processes the observed travel times 122 and the calculated travel times generated for each of the reflection events 118 using a model update engine 124 to generate a velocity model update 126. The velocity model update 126 defines an adjustment to the current velocity model 106 that may cause the discrepancy between the observed travel times 122 and the calculated travel times for the reflection events 118 determined at the next update iteration to be reduced. The system 100 uses the velocity model update 126 to update the velocity model 106, and optionally performs one or more additional update iterations. If the system 100 determines that no further update iterations should be performed, the system 100 can output the current velocity model 106.

Figure 2:
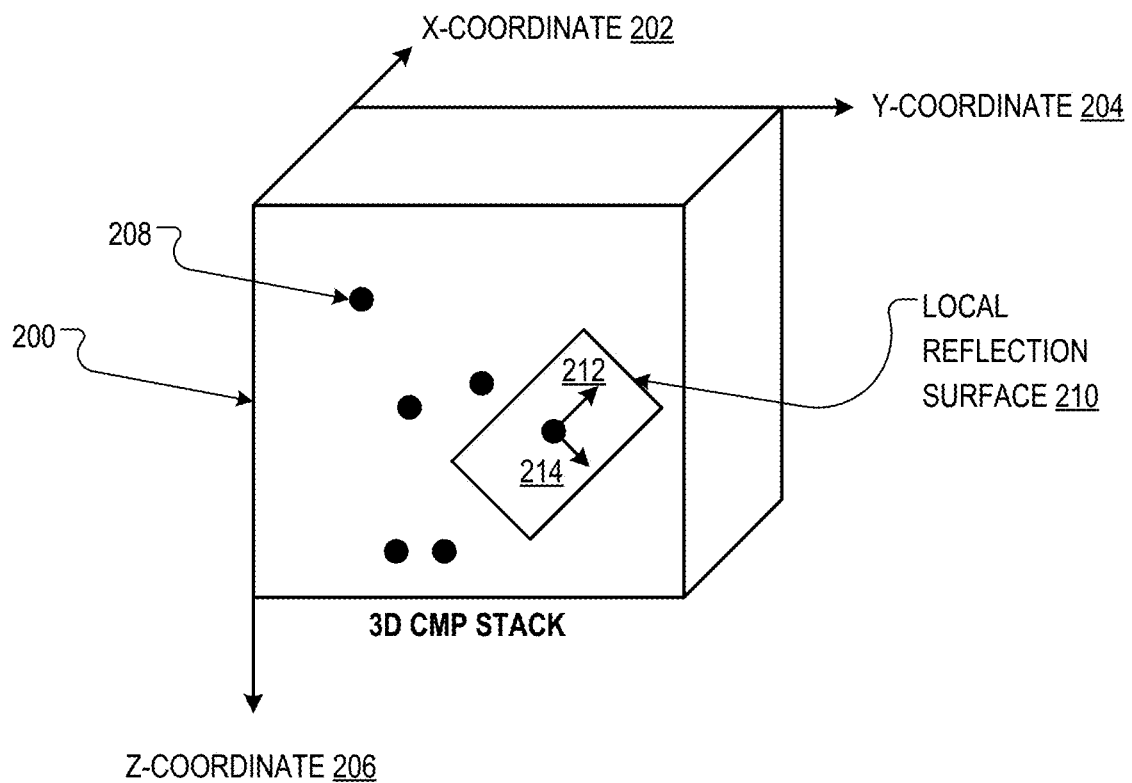
FIG. 2 illustrates a 3D volume representing post-stack seismic data in the common midpoint (CMP) domain and points in the post-stack seismic data that are determined to correspond to local reflection surfaces.

FIG. 2 illustrates a 3D volume 200 representing post-stack seismic data in the common midpoint (CMP) domain. More specifically, the post-stack seismic data is represented as 3D matrix indexed by x-coordinates 202, y-coordinates 204, and z-coordinates 206. The post-stack seismic data corresponding to a given pair of x-y coordinates represents the reflected travel times of seismic waves generated by seismic sources and seismic receivers with a common midpoint given by the x-y coordinate. The "midpoint" between a seismic source and a seismic receiver refers to a point along a straight line connecting the seismic source and the seismic receiver that is equidistant from each of them. The z-coordinate corresponds to a time dimension. As will be described in more detail with reference to FIG. 6, the system can identify points in the pre-stack data space (for example, the point 208) with semblance kinematic values that exceed a predetermined threshold as corresponding to local reflection surfaces (for example, the local reflection surface 210). The inline and crossline directions of the local reflection surface 210 are depicted by 212 and 214. Each of the local reflection surfaces is localized in depth by using normal ray tracing and the current velocity model to determine the respective position and orientation of the local reflection surface.

Figure 3:
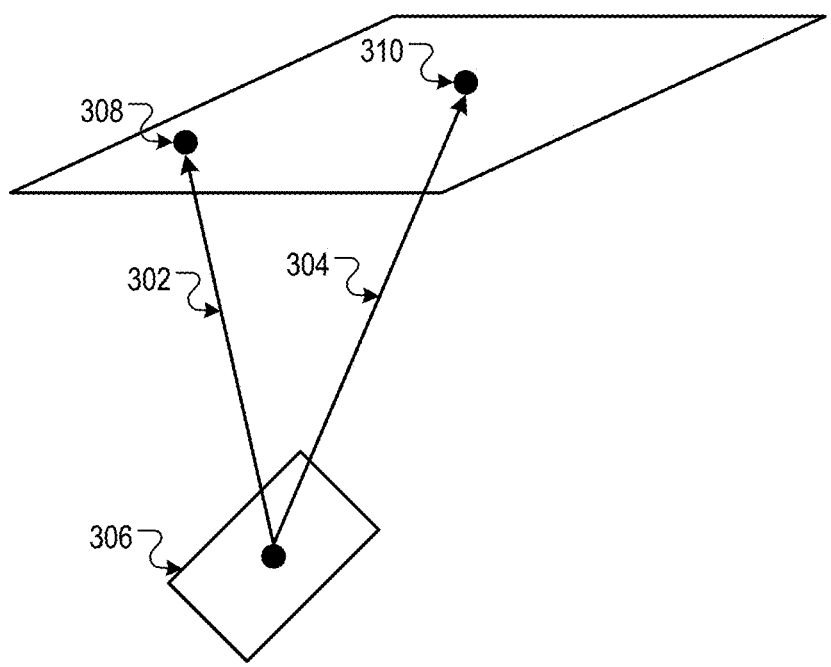
FIG. 3 illustrates reflected rays that are traced from the local reflection surface towards the acquisition surface using the current velocity model.

FIG. 3 illustrates reflected rays 302 and 304 that are traced from the local reflection surface 306 (that is, in the post-stack data space) towards the acquisition surface using the current velocity model. The travel times along these reflected rays (that is, that are determined using the current velocity model) represent the calculated travel time for a reflection event. The reflection event may correspond to, for example: (i) the seismic source position 308, (ii) the reflection surface 306, and (iii) the seismic receiver position 310.

Figure 4:
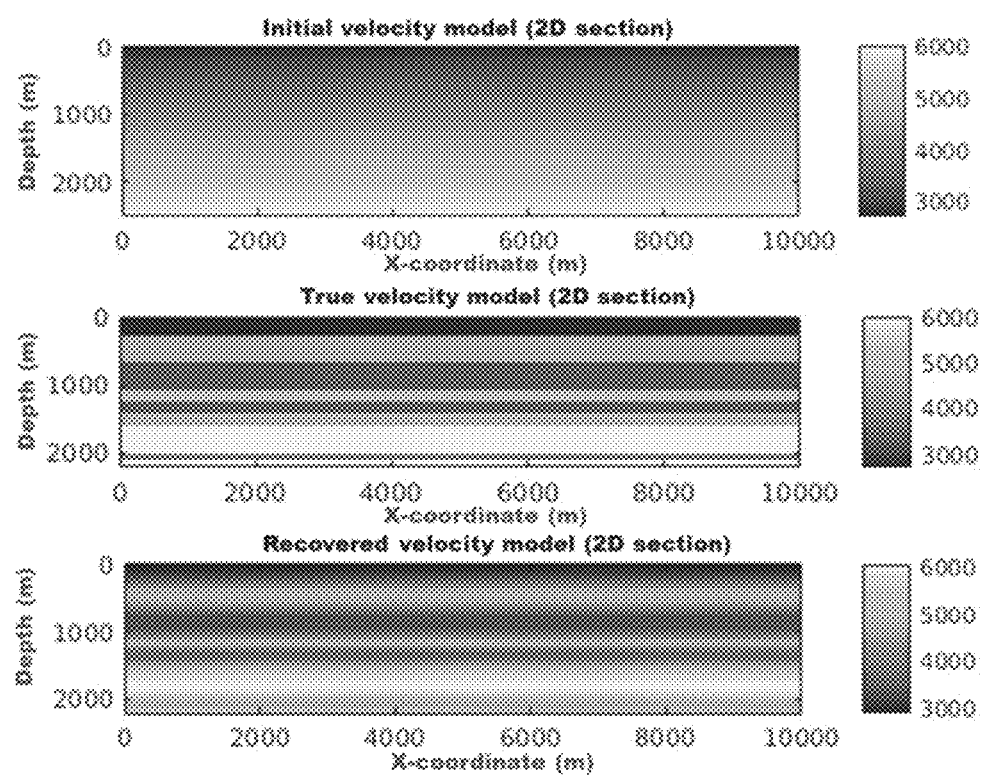
FIG. 4 illustrates the results of applying the velocity modeling system on synthetic pre-stack and post-stack seismic data.

FIG. 4 illustrates the results of applying the velocity modeling system 100 described in this specification on synthetic (that is, computer generated) pre-stack and post-stack seismic data. The initial velocity model (that is, that is used at the first update iteration), the true velocity model, and the recovered velocity model (that is, the velocity model generated by the system 100) are each depicted in a cross-sectional format. That is, each of the velocity models is depicted by a "slice" along the x-coordinate (where "m" refers to "meters") and depth-coordinate (where "m" refers to "meters") directions of a full 3D data set representing the velocity model. The initial velocity model indicates that the velocities of seismic waves increase approximately linearly with depth in the geological region, whereas the true velocity model indicates that the velocities of seismic waves vary with depth in accordance with a highly non-linear relationship. It can be appreciated that the recovered velocity model generated by the system 100 is an accurate approximation of the true velocity model that effectively captures the non-linear relationship governing the velocities of seismic waves at various depths.

Figure 5:
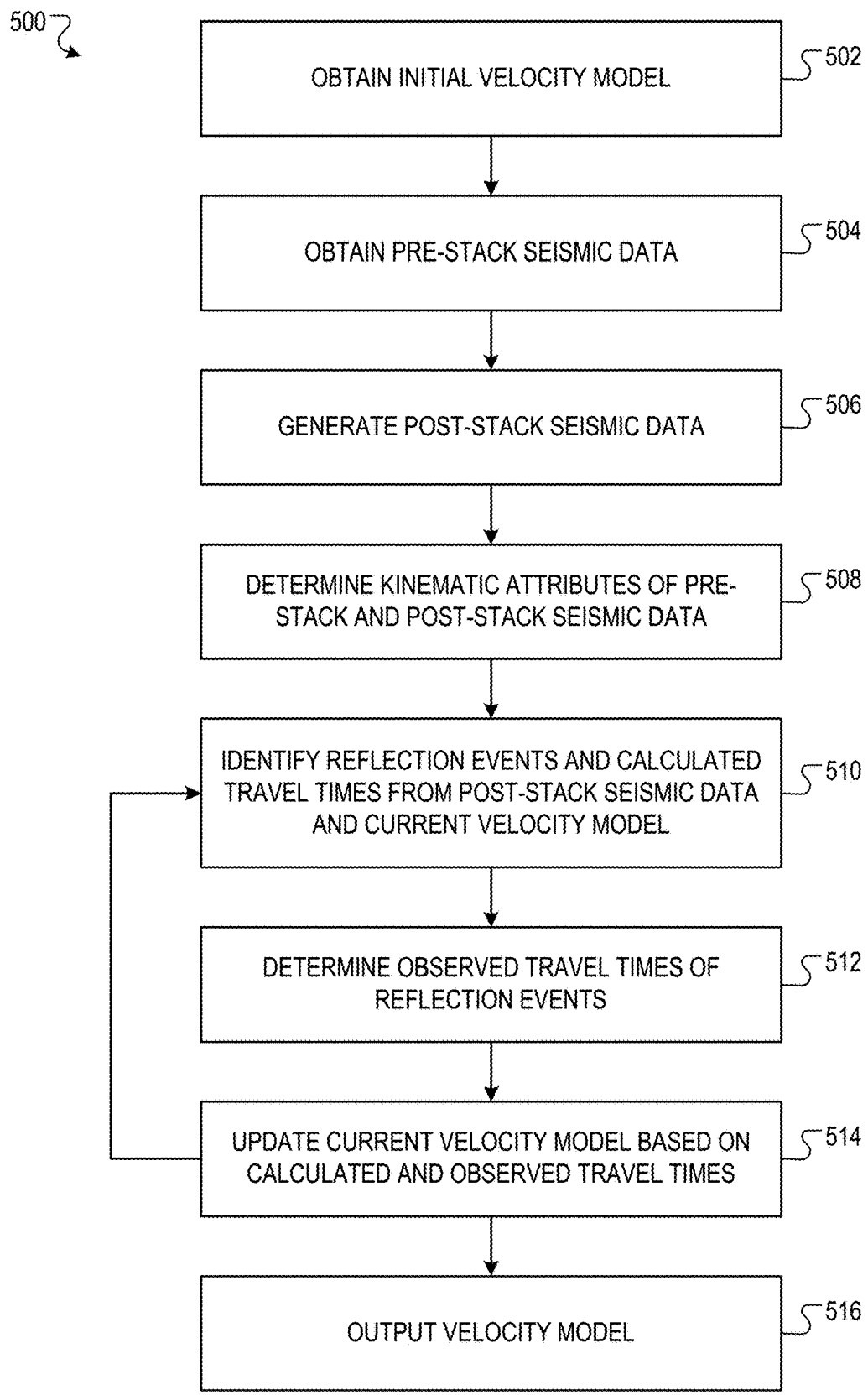
FIG. 5 is a flow diagram of an example process for determining a velocity model based on kinematic features derived from both pre-stack and post-stack seismic data.

FIG. 5 is a flow diagram of an example process 500 for determining a velocity model based on kinematic features derived from both pre-stack and post-stack seismic data. For convenience, the process 500 will be described as being performed by a system of one or more computers located in one or more locations. For example, a velocity modeling system, for example, the velocity modeling system 100 of FIG. 1, appropriately programmed in accordance with this specification, can perform the process 500.

The system obtains an initial velocity model for a geological region that characterizes velocities of seismic waves traveling through different spatial locations in a geological region (502). The initial velocity model may be a predetermined (that is, fixed) velocity model, for example, a velocity model that associates each spatial position in the geological region with the same predetermined velocity.

The system obtains pre-stack seismic data that includes a large number of seismic traces characterizing the geological region (504). Each trace characterizes the magnitude of the motion of the Earth at a respective receiver position due to a seismic wave generated at a respective source position. In some cases, the seismic sources and the seismic receivers that are used to generate the pre-stack seismic data are arranged in an orthogonal layout. More specifically, the array of seismic sources may be spaced (for example, at regular intervals) along a first line on the surface of the geological region. The array of seismic receivers may be spaced (for example, at regular intervals) along a second line on the surface of the geological region, where the second line is orthogonal to the first line. In this case, the pre-stack seismic data is referred to as being in the "cross-spread domain". For example, for pre-stack seismic data in the cross-spread domain, the data space may be parameterized by coordinates including: (i) an x-coordinate corresponding to the seismic receivers, (ii) a y-coordinate corresponding to the seismic sources, and (iii) a z-coordinate corresponding to reflected travel times.

The system processes the pre-stack seismic data using a stacking technique to generate post-stack seismic data (506). For example, the system can generate post-stack seismic data that includes a large number of seismic traces, where each trace in the post-stack seismic data is obtained by combining (for example, averaging) multiple traces from the pre-stack seismic data. The post-stack seismic data can be represented in any appropriate format, for example, in a 3D common midpoint (CMP) domain. In addition to generating the post-stack seismic data, the system additionally generates an NMO velocity model.

The system processes the pre-stack seismic data and the post-stack seismic data to generate kinematic features that respectively characterize the pre-stack seismic data and the post-stack seismic data (508). The kinematic features of the pre-stack and post-stack seismic data may represent dips and curvatures of seismic wave-fronts in specific directions in the respective domains of the pre-stack and post-stack seismic data. More specifically, the kinematic features of the pre-stack and post-stack seismic data may correspond to first and second partial derivatives of reflected travel times in the vicinities of reference points in the pre-stack and post-stack data spaces. For example, the kinematic features of the pre-stack seismic data may include first and second partial derivatives in the x- and y-coordinate directions in the cross-spread domain. As another example, the kinematic features of the post-stack seismic data may include first and second partial derivatives in the x- and y-coordinate directions in the CMP domain. The kinematic features of the pre-stack and post-stack seismic data may also include "semblance" features that characterize the coherency of local seismic event. A semblance kinematic feature corresponding to a time point in a pre-stack or post-stack seismic trace may be determined by computing the cross-correlation between the value of the seismic trace at the time point and the values of neighboring seismic traces at the time point.

To reduce computational resource consumption, the system may generate pre-stack kinematic features that characterize only a proper subset of the total number of seismic traces included in the pre-stack seismic data. For example, the system may generate pre-stack kinematic features for only seismic traces corresponding to a coarse grid over the pre-stack seismic data space. In this example, if the pre-stack seismic data is represented in the cross-spread domain, the system may generate seismic features for only traces corresponding to a fraction of the x- (that is, seismic source) and y- (that is, seismic receiver) coordinates.

In some cases, the system generates the kinematic features of the pre-stack seismic data as part of a data enhancement procedure based on NLBF that is applied to the pre-stack seismic data. In particular, the data enhancement procedure may collect signals from neighboring traces in the pre-stack seismic data along locally-defined surfaces that describe local moveouts of coherent seismic signals. Applying an NLBF data enhancement procedure to the pre-stack seismic data can increase the SNR of the pre-stack seismic data. In cases when the system applies an NLBF data enhancement procedure to the pre-stack seismic data, the system may generate the post-stack seismic data and the NMO velocities based on the enhanced pre-stack seismic data. Generating the post-stack seismic data and the NMO velocities based on the enhanced pre-stack seismic data may improve the stability and quality of the post-stack seismic data.

Steps 510-514 jointly describe operations that can be performed at each of multiple update iterations. As will be described in more detail later, the current velocity model is updated at each update iteration, and a final velocity model is output after the last update iteration. At the first update iteration, the initial velocity model (that is, as described with reference to 502) defines the "current" velocity model. At each subsequent update iteration, the "current" velocity model refers to the velocity model determined at the conclusion of the previous update iteration.

The system processes the post-stack kinematic features and the current velocity model to identify multiple reflection events (510). Each reflection event corresponds to: (i) a position of a seismic source that transmits a seismic wave, (ii) a local reflection surface in the geological region, and (iii) a position of a seismic receiver that receives a reflection of the seismic wave from the local reflection surface. Each local reflection surface may be characterized by: (i) the local slopes of the local reflection surface in the inline and crossline directions and (ii) the normal two-way travel time corresponding to the reflection surface. The normal two-way travel time refers to the two-way travel time of a reflected seismic wave that travels along the normal ray to the local reflection surface. The position of the seismic source and the seismic receiver of the reflection event may be expressed in CMP coordinates. The system also determines a respective calculated travel time for each reflection event under the current velocity model. An example process for identifying reflection events and determining calculated travel times from the post-stack kinematic features and the current velocity model is described in more detail with reference to FIG. 6.

The system determines a respective observed travel time of each of the reflection events based on: (i) an NMO travel time derived from the NMO velocity model, and (ii) a first correction term based on the semblance pre-stack kinematic features (512). If the pre-stack kinematic features are computed on a coarse grid in the pre-stack data space, then the observed travel time may also be determined based on a second correction term derived from first and second partial derivative pre-stack kinematic features.

The system can determine the NMO travel time of a reflection event based on the normal two-way travel time of the reflection event, the offset between the source position and the receiver position corresponding to the reflection event, and the NMO velocity corresponding to the reflection event. For example, the system can determine the NMO travel time of a reflection event as:

$$T_{NMO} = \sqrt{T_0^2 + \frac{h^2}{V_{NMO}^2}} \quad (1)$$

$$h = \sqrt{(X_r - X_s^*)^2 + (Y_r^* - Y_s)^2} \quad (2)$$

where $T_{NMO}$ is the NMO travel time of the reflection event, $T_0$ is the normal two-way travel time of the reflection event, h is the offset between the source position and the receiver position corresponding to the reflection event, $X_r$ and $X_s^+$ are the x-coordinates respectively corresponding to the receiver and source positions, $Y_r^+$ and $Y_s$ are the y-coordinates respectively corresponding to the receiver and source positions corresponding to the reflection event, and $V_{NMO}$ is the NMO velocity corresponding to the reflection event. The coordinates of the source and receiver positions may be expressed in the CMP domain.

The system can determine the first correction term based on the semblance pre-stack kinematic features. For example, the system can determine the first correction term by determining an offset from the NMO travel time of the reflection event that maximizes the semblance kinematic feature along the pre-stack trace corresponding to the source and receiver position of the reflection event. That is, the system can determine the first correction term as:

$$dT_{SEMBL} = \max_{-\epsilon < dT < \epsilon} \text{Semblance}(X_r, Y_r^*, X_s^*, Y_s, T_{NMO} + dT) \quad (3)$$

where $dT_{SEMBL}$ is the first correction term, E is a positive constant, and Semblance($X_r, Y_r, X_s, Y_s, T_{NMO}+dT$) is the value of the semblance kinematic feature of the pre-stack data trace corresponding to receiver position ($X_r, Y_r^*$) and source position ($X_s^*, Y_s$) at time point $T_{NMO}+dT$.

The system can determine the observed travel time $T_{OBS}$ for the reflection event based on the NMO travel time $T_{NMO}$ and the first correction term $dT_{SEMBL}$ corresponding to the reflection event. For example, the system can determine the observed travel time for the reflection event as:

$$T_{OBS}=T_{NMO}+dT_{SEMBL} \quad (4)$$

where $T_{NMO}$ is given by equation 1 and $dT_{SEMBL}$ is given by equation 3.

The system may determine the observed travel time for the reflection event differently if the system computes the pre-stack kinematic features on a coarse grid in the pre-stack data space (that is, rather than computing pre-stack kinematic features for each pre-stack trace). In particular, the system may identify a "parametric" pre-stack trace by determining the pre-stack trace that is closest to the pre-stack trace corresponding to the reflection event from among the pre-stack traces for which kinematic features were computed. The pre-stack trace corresponding to the reflection event refers to the pre-stack trace corresponding to the same source and receiver positions as the reflection event. The source position of the parametric trace is represented in this specification as $(X_s^*, Y_s^{par})$ and receiver position of the parametric trace is represented in this specification as $(X_r^{par}, Y_r^*)$. The system may determine the "closeness" of respective traces based on any appropriate numerical similarity measure, for example, a Euclidean distance measure between the receivers and sources of the respective traces (for example, as provided by equation 5).

After identifying the parametric trace, the system may determine the NMO travel time of the reflection event in accordance with equation 1, where the offset h is given by:

$$h=(X_r^{par}-X_s^*)+(Y_r^*-Y_s^{par})^2 \quad (5)$$

The system may determine the first correction term based on the semblance kinematic features corresponding to the parametric trace. For example, the system may determine the first correction term as:

$$dT_{SEMBL} = \max_{-\epsilon<dT<\epsilon} \text{Semblance } (X_r^{par}, Y_r^*, X_s^*, Y_s^{par}, T_{NMO}+dT) \quad (6)$$

where the variables in equation 6 are defined analogously to the variables in equation 3.

The system may determine the second correction term $dT_{NLBF}$ based on the first and second partial derivative pre-stack kinematic features corresponding to the parametric trace. For example, the system may determine the second correction term as:

$$dT_{NLBF}=A\cdot\Delta x+B\cdot\Delta y+\tfrac{1}{2}(C\cdot\Delta x\Delta y+D\cdot\Delta x^2+E\cdot\Delta y^2) \quad (7)$$

$$\Delta x=X_r^{par}-X_r \quad (8)$$

$$\Delta y=Y_s^{par}-Y_s \quad (9)$$

where A is the first partial derivative in the x-direction, B is the first partial derivative in the y-direction, C is the partial derivative in the x- and y-direction, D is the second partial derivative in the x-direction, and E is the second partial derivative in the y-direction, where all the partial derivatives are computed (using any appropriate numerical method) at the pre-stack parametric trace (for example, in the cross-spread domain), $X_r$ is the x-coordinate of the receiver of the reflection event, and $Y_s$ is the y-coordinate of the source of the reflection event.

The system can determine the observed travel time for the reflection event based on the NMO travel time $T_{NMO}$, the first correction term $dT_{SEMBL}$, and the second correction term $dT_{NLBF}$ corresponding to the reflection event. For example, the system can determine the observed travel time for the reflection event as:

$$T_{OBS}=T_{NMO}+dT_{SEMBL}+dT_{NLBF} \quad (10)$$

The system updates the current velocity model based on the difference between the calculated and observed travel times for each reflection event (514). The system can determine the update to the current velocity model using any appropriate tomographic inversion technique, for example, the tomographic inversion technique described with reference to Woodward et al., "A decade of tomography", Geophysics, 73(5), VE5-VE11, 2008.

The system continues to iteratively repeat the steps 510-514 until the difference between the calculated and observed travel times of reflection events is minimized (or approximately minimized). After determining that the difference between the calculated and the observed travel times of reflection events is minimized (or approximately minimized), the system can output the obtained velocity model (516).

Figure 6:
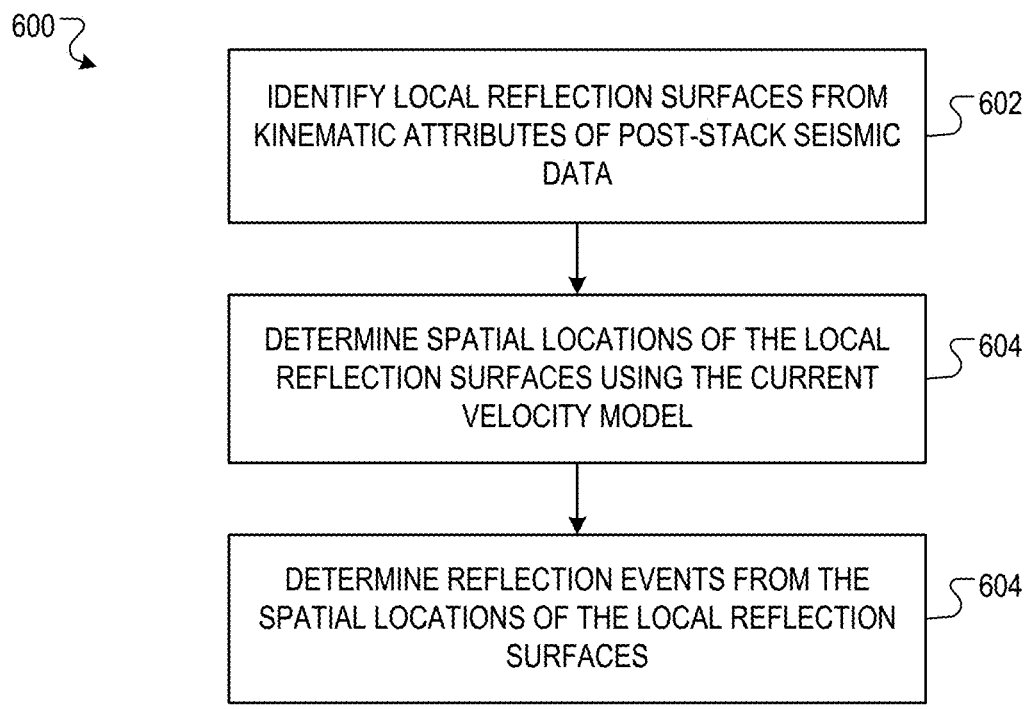
FIG. 6 is a flow diagram of an example process for identifying reflection events and determining calculated travel times using a current velocity model and kinematic features of post-stack seismic data.

FIG. 6 is a flow diagram of an example process 600 for identifying reflection events and determining calculated travel times using a current velocity model and kinematic features of post-stack seismic data. For convenience, the process 600 will be described as being performed by a system of one or more computers located in one or more locations. For example, a velocity modeling system, for example, the velocity modeling system 100 of FIG. 1, appropriately programmed in accordance with this specification, can perform the process 600.

The system identifies local reflection surfaces from the kinematic features of the post-stack data (602). For example, the system may determine that any point in a trace in the post-stack data with a semblance kinematic value that exceeds a predetermined threshold corresponds to a local reflection surface. The system may characterize the local reflection surface by the local slopes of the local reflection surface in the inline and crossline directions (for example, which may be determined from the kinematic features of the post-stack data), the two-way travel time along the normal ray to the local reflection surface, and the CMP associated with the point in the local reflection surface.

The system determines a respective spatial location for each identified local reflection surface using the current velocity model (604). The spatial location of a local reflection surface can be defined by the spatial coordinates of a point in the local reflection surface and a normal vector to the local reflection surface. The spatial coordinates of a point in the local reflection surface may be defined by (x,y,z) coordinates, where the x- and y-coordinates are in the CMP domain and the z-coordinate represents depth. The normal vector may be defined in the same coordinate system. The system may determine the spatial location of a local reflection surface by tracing a ray from the point $(X_{CMP}, Y_{CMP})$ at the acquisition surface that corresponds to the point in the local reflection surface with an initial direction defined by the inline and crossline directions of the local reflection surface. The system traces the ray into the current velocity model until half of the two-way travel time along the normal ray to the local reflection surface expires. The final position and orientation of the traced ray provides the spatial location of the local reflection surface.

The system determines multiple reflection events corresponding to the local reflection surfaces (606). Each reflection event corresponds to: (i) a position of a seismic source that transmits a seismic wave, (ii) a local reflection surface, and (iii) a position of a seismic receiver that receives a reflection of the seismic wave from the local reflection surface. For example, the system may determine a reflection event corresponding to a local reflection surface by tracing two corresponding rays from the spatial location of the local reflection surface towards the acquisition surface. The two rays are selected to satisfy Snell's law at the local reflection surface. The respective positions at which the rays penetrate the acquisition surface define the positions of the seismic source and seismic receiver corresponding to the local reflection event.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, for example, an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or any other kind of central processing unit. Generally, a central processing unit will receive instructions and data from a read-only memory, a random access memory, or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, for example, a smartphone that is running a messaging application, and receiving responsive messages from the user in return.

Data processing apparatus for implementing machine learning models can also include, for example, special-purpose hardware accelerator units for processing common and compute-intensive parts of machine learning training or production, that is, inference, workloads.

Machine learning models can be implemented and deployed using a machine learning framework, for example, a TensorFlow framework, a Microsoft Cognitive Toolkit framework, an Apache Singa framework, or an Apache MXNet framework.

Embodiments of the subject matter described in this specification can be implemented in a computing system that includes a back-end component, for example, as a data server, or that includes a middleware component, for example, an application server, or that includes a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described in this specification as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described in this specification should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method implemented by one or more data processing apparatus, the method comprising:
    obtaining a current velocity model for a geological region that characterizes, for each of a plurality of spatial locations in the geological region, a respective velocity of seismic waves traveling through the spatial location;
    obtaining: (i) pre-stack seismic data comprising a plurality of seismic traces characterizing the geological region, and (ii) post-stack seismic data generated based on the pre- stack seismic data using a seismic stacking technique; and
    for each of a plurality of iterations:
        identifying a plurality of reflection events from the post-stack seismic data and the current velocity model, wherein each reflection event corresponds to: (i) a position of a seismic source that transmits a seismic wave, (ii) a local reflection surface in the geological region, and (iii) a position of a seismic receiver that receives a reflection of the seismic wave from the local reflection surface;
        determining a respective observed travel time for each of the plurality of reflection events, comprising, for each reflection event:
            identifying a respective seismic trace included in the pre-stack seismic data based on the reflection event; and
            determining the respective observed travel time for the reflection event based at least in part on kinematic features derived from the respective seismic trace included in the pre-stack seismic data; and
        updating the current velocity model based at least in part on the observed travel times of the plurality of reflection events.

2. The method of claim 1, further comprising:
    generating enhanced pre-stack seismic data by applying a non-linear beamforming data enhancement technique to the pre-stack seismic data, comprising deriving kinematic features of seismic traces included in the pre-stack seismic data;
    wherein the post-stack seismic data is generated by processing the enhanced pre-stack seismic data using the seismic stacking technique.

3. The method of claim 2, wherein deriving kinematic features of the seismic traces included in the pre-stack seismic data comprises generating first partial derivatives, second partial derivatives, and semblance features at reference points in the pre-stack seismic data.

4. The method of claim 3, wherein the reference points in the pre-stack seismic data are on a grid.

5. The method of claim 1, wherein identifying a reflection event comprises:
   identifying a point in the post-stack seismic data that corresponds to a respective local reflection surface based on a kinematic feature derived at the point in the post-stack seismic data;
   determining a spatial location of the respective local reflection surface by performing ray tracing using the current velocity model, comprising tracing a ray from an acquisition surface into the current velocity model until half of a two-way travel time along a normal ray of the respective local reflection surface expires; and
   determining a position of a respective seismic source and a position of a respective seismic receiver based on the spatial location of the respective local reflection surface.

6. The method of claim 5, wherein:
   determining the position of the respective seismic source comprises:
      tracing a first ray from the spatial location of the respective local reflection surface to the acquisition surface using the current velocity model; and
      determining the position of the respective seismic source based on a position at which the first ray penetrates the acquisition surface; and
   determining the position of the respective seismic receiver comprises:
      tracing a second ray from the spatial location of the respective local reflection surface to the acquisition surface using the current velocity model; and
      determining the position of the respective seismic receiver based on a position at which the second ray penetrates the acquisition surface.

7. The method of claim 1, wherein determining the respective observed travel time for the reflection event based at least in part on kinematic features derived from the respective seismic trace included in the pre-stack seismic data comprises:
   determining a normal-moveout travel time from a normal-moveout velocity model;
   determining a first correction term based on the kinematic features derived from the respective seismic trace included in the pre-stack seismic data, comprising:
      determining, based on the normal-moveout travel time, a first time at which a semblance kinematic feature derived from the respective seismic trace included in the pre-stack seismic data is locally maximized; and
      determining the first correction term based on the first time;
   determining the respective observed travel time for the reflection event based on the normal-moveout travel time and the first correction term.

8. The method of claim 7, wherein:
   kinematic features are computed for only a proper subset of the seismic traces of the pre- stack seismic data; and
   identifying a respective seismic trace included in the pre-stack seismic data based on the reflection event comprises:
      determining that the respective seismic trace is associated with a given seismic trace corresponding to the seismic source and the seismic receiver of the reflection event from among the proper subset of the seismic traces of the pre-stack seismic data for which kinematic features are computed.

9. The method of claim 8, further comprising:
   determining a second correction term based on the kinematic features derived from the respective seismic trace included in the pre-stack seismic data, comprising:
      determining the second correction term based on: (i) first and second partial derivative kinematic features derived from the respective seismic trace included in the pre-stack seismic data, and (ii) a distance between the respective seismic trace and the given seismic trace corresponding to the seismic source and seismic receiver of the reflection event; and
      determining the respective observed travel time based on the second correction term in addition to the normal-moveout travel time and the first correction term.

10. The method of claim 1, wherein:
    identifying the plurality of reflection events from the post-stack seismic data and the current velocity model comprises determining a respective calculated travel time for each of the plurality of reflection events; and
    updating the current velocity model comprises:
       for each of the plurality of reflection events, determining a difference between the calculated travel time for the reflection event and the observed travel time for the reflection event; and
       determining an update to the current velocity model based on the differences between the calculated travel times and the observed travel times using a tomographic inversion technique.

11. The method of claim 1, further comprising, after a final update iteration:
    providing the current velocity model for use in characterizing the geological region.

12. A system comprising:
    one or more computers; and
    one or more storage devices communicatively coupled to the one or more computers, wherein the one or more storage devices store instructions that, when executed by the one or more computers, cause the one or more computers to perform operations comprising:
       obtaining a current velocity model for a geological region that characterizes, for each of a plurality of spatial locations in the geological region, a respective velocity of seismic waves traveling through the spatial location; and
       obtaining: (i) pre-stack seismic data comprising a plurality of seismic traces characterizing the geological region, and (ii) post-stack seismic data generated based on the pre-stack seismic data using a seismic stacking technique;
       for each of a plurality of iterations:
          identifying a plurality of reflection events from the post-stack seismic data and the current velocity model, wherein each reflection event corresponds to: (i) a position of a seismic source that transmits a seismic wave, (ii) a local reflection surface in the geological region, and (iii) a position of a seismic receiver that receives a reflection of the seismic wave from the local reflection surface;
          determining a respective observed travel time for each of the plurality of reflection events, comprising, for each reflection event:
             identifying a respective seismic trace included in the pre-stack seismic data based on the reflection event; and determining the respective observed travel time for the reflection event based at least in part on kinematic features derived from the respective seismic trace included in the pre-stack seismic data; and updating the current velocity model based at least in part on the observed travel times of the plurality of reflection events.

13. The system of claim 12, wherein the operations further comprise:

generating enhanced pre-stack seismic data by applying a non-linear beamforming data enhancement technique to the pre-stack seismic data, comprising deriving kinematic features of seismic traces included in the pre-stack seismic data;

wherein the post-stack seismic data is generated by processing the enhanced pre-stack seismic data using the seismic stacking technique.

14. The system of claim 13, wherein deriving kinematic features of the seismic traces included in the pre-stack seismic data comprises generating first partial derivatives, second partial derivatives, and semblance features at reference points in the pre-stack seismic data.

15. The system of claim 14, wherein the reference points in the pre-stack seismic data are on a grid.

16. The system of claim 12, wherein identifying a reflection event comprises:

identifying a point in the post-stack seismic data that corresponds to a respective local reflection surface based on a kinematic feature derived at the point in the post-stack seismic data;

determining a spatial location of the respective local reflection surface by performing ray tracing using the current velocity model, comprising tracing a ray from an acquisition surface into the current velocity model until half of a two-way travel time along a normal ray of the respective local reflection surface expires; and determining a position of a respective seismic source and a position of a respective seismic receiver based on the spatial location of the respective local reflection surface.

17. One or more non-transitory computer storage media storing instructions that when executed by one or more computers cause the one or more computers to perform operations comprising:

obtaining a current velocity model for a geological region that characterizes, for each of a plurality of spatial locations in the geological region, a respective velocity of seismic waves traveling through the spatial location;

obtaining: (i) pre-stack seismic data comprising a plurality of seismic traces characterizing the geological region, and (ii) post-stack seismic data generated based on the pre-stack seismic data using a seismic stacking technique; and for each of a plurality of iterations:

identifying a plurality of reflection events from the post-stack seismic data and the current velocity model, wherein each reflection event corresponds to: (i) a position of a seismic source that transmits a seismic wave, (ii) a local reflection surface in the geological region, and (iii) a position of a seismic receiver that receives a reflection of the seismic wave from the local reflection surface;

determining a respective observed travel time for each of the plurality of reflection events, comprising, for each reflection event:

identifying a respective seismic trace included in the pre-stack seismic data based on the reflection event; and determining the respective observed travel time for the reflection event based at least in part on kinematic features derived from the respective seismic trace included in the pre-stack seismic data; and updating the current velocity model based at least in part on the observed travel times of the plurality of reflection events.

18. The non-transitory computer storage media of claim 17, wherein the operations further comprise:

generating enhanced pre-stack seismic data by applying a non-linear beamforming data enhancement technique to the pre-stack seismic data, comprising deriving kinematic features of seismic traces included in the pre-stack seismic data;

wherein the post-stack seismic data is generated by processing the enhanced pre-stack seismic data using the seismic stacking technique.

19. The non-transitory computer storage media of claim 18, wherein deriving kinematic features of the seismic traces included in the pre-stack seismic data comprises generating first partial derivatives, second partial derivatives, and semblance features at reference points in the pre-stack seismic data.

20. The non-transitory computer storage media of claim 19, wherein the reference points in the pre-stack seismic data are on a grid.

* * * * *